United States Patent [19]

Rivers

[11] 4,456,050
[45] Jun. 26, 1984

[54] HINGE LOCK MECHANISM FOR DISPLAY UNITS

[76] Inventor: Robert Rivers, 1114 Linden Ave., Sharon Hill, Pa. 19079

[21] Appl. No.: 84,720

[22] Filed: Oct. 15, 1979

[51] Int. Cl.$^3$ ............... A47G 5/00; E05D 11/10
[52] U.S. Cl. ............................... 160/233; 16/337; 160/135; 403/306
[58] Field of Search ............ 160/229 R, 233, 185, 160/135, 220, 351; 16/158, 159, 141, 140; 52/71; 403/306, 171, 176

[56] References Cited

U.S. PATENT DOCUMENTS

| | | | |
|---|---|---|---|
| 1,818,182 | 8/1931 | Woernle | 16/140 |
| 1,835,129 | 12/1931 | Woernle | 16/140 |
| 3,031,713 | 5/1962 | Ramien | 16/159 |
| 3,677,322 | 7/1972 | Brorson et al. | 160/135 |
| 3,735,794 | 5/1973 | Lebowitz | 160/351 X |
| 3,805,327 | 4/1974 | Walker | 16/159 |
| 3,889,736 | 6/1975 | Firks | 160/229 R X |
| 4,011,682 | 3/1977 | Ach | 160/135 X |

FOREIGN PATENT DOCUMENTS

| | | | |
|---|---|---|---|
| 1013918 | 7/1977 | Canada | 160/135 |
| 2420864 | 11/1975 | Fed. Rep. of Germany | 403/171 |
| 1295483 | 5/1962 | France | 16/158 |
| 2262770 | 9/1975 | France | 403/171 |

Primary Examiner—Rodney H. Bonck
Attorney, Agent, or Firm—Susan Borden Evans; David Edwards

[57] ABSTRACT

A hinge lock mechanism for lockingly joining two panels together at any angle comprising top and bottom arms with a slanted flat surface thereon. These arms are secured into the panels by clamping means that has a set screw therein that is urged against the slanted flat surface of the arms. This hinge lock mechanism forms a continuous edge at the junction of the two panels and cannot be seen from the desired side of the panels.

14 Claims, 15 Drawing Figures

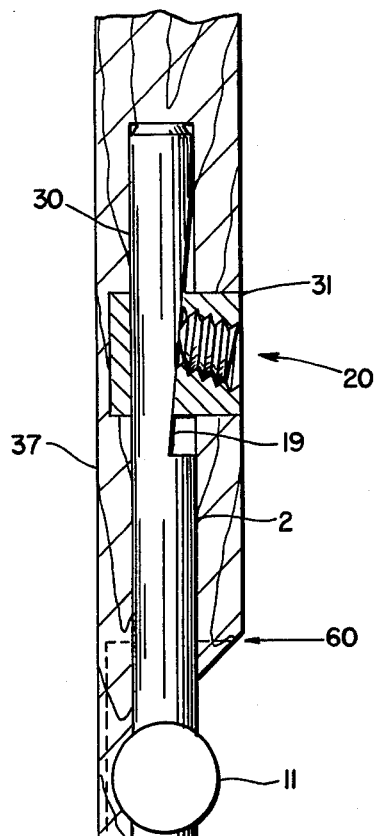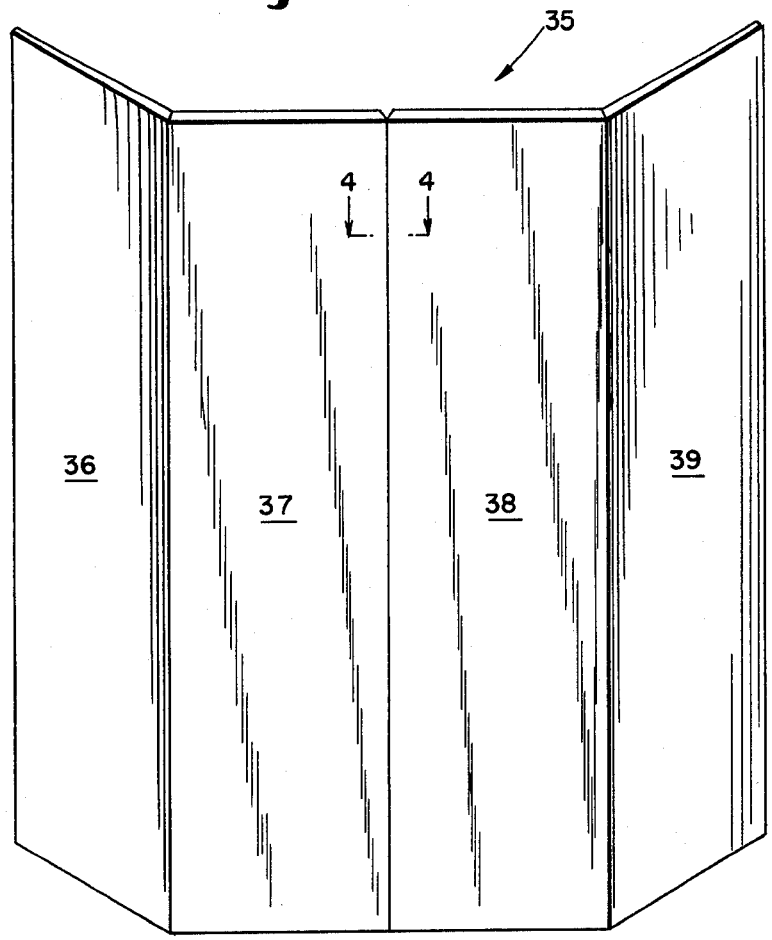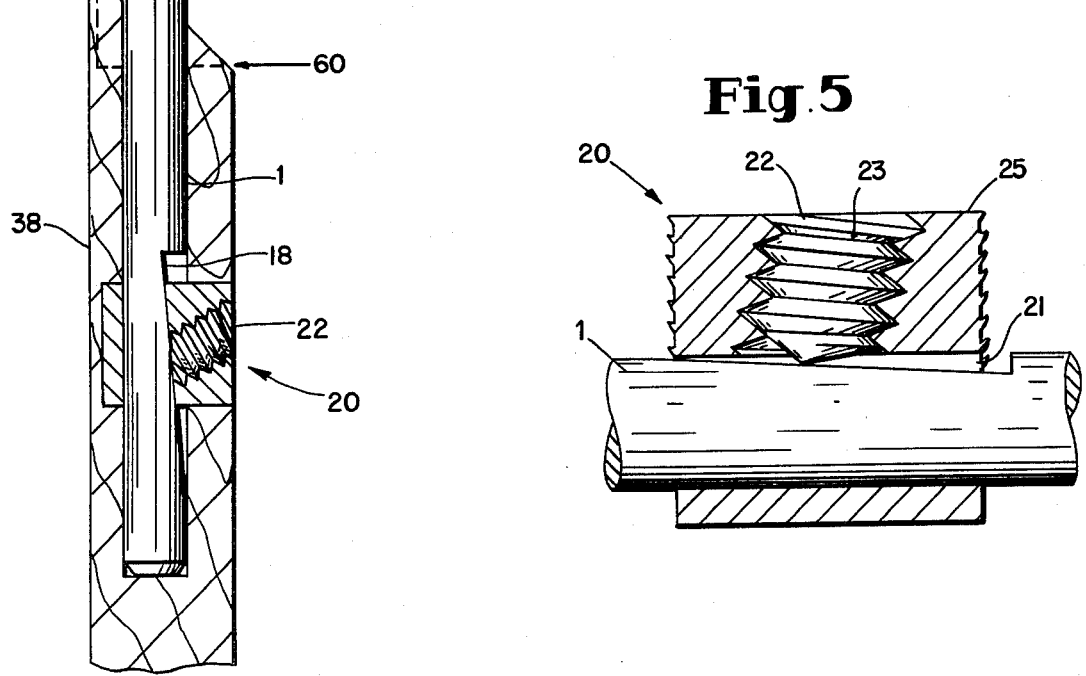

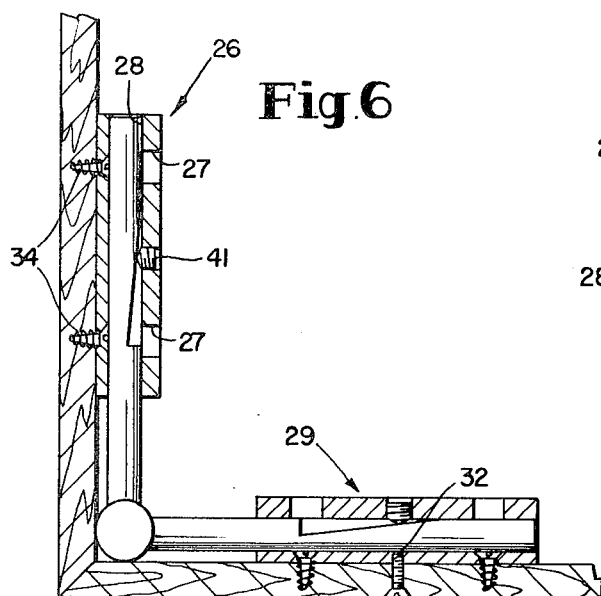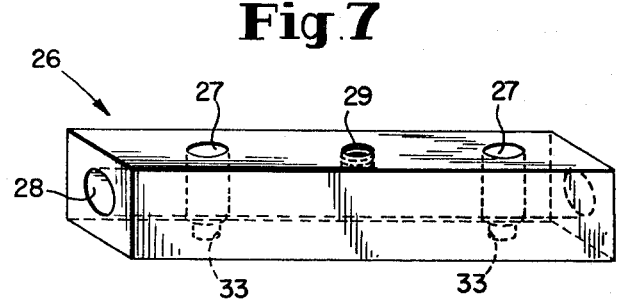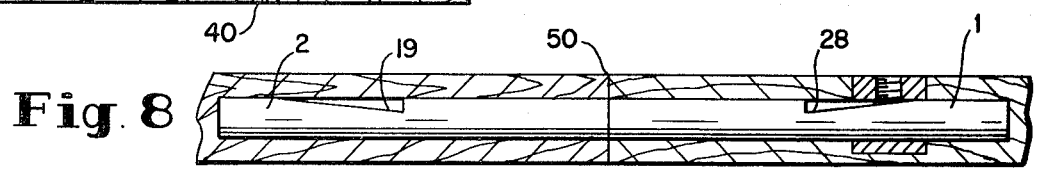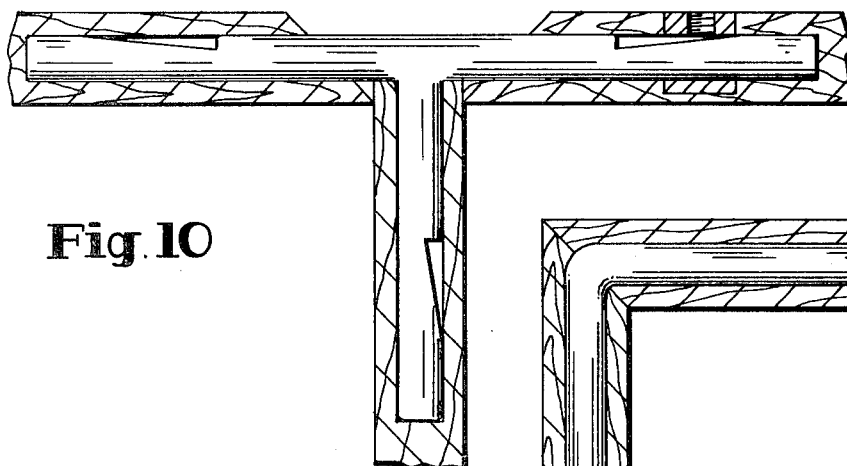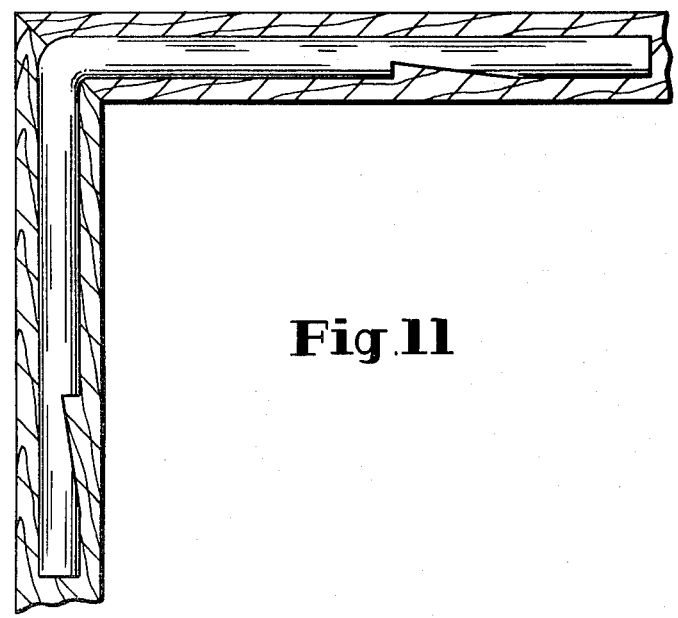

HINGE LOCK MECHANISM FOR DISPLAY UNITS

BACKGROUND OF THE INVENTION

The invention relates to a hinge lock mechanism for joining sight dividers, or other moveable or dismountable panels or partitions, for use in erecting temporary, non-structural wall panels or the like.

Prior to the present invention, moveable panels could only be joined together having unattractive seams. For example, U.S. Pat. Nos. 3,428,108 and 3,889,736 show moveable panel connectors where the desired edge of the panels are not continuous and the connectors are visible making the display unattractive. The panels in these patents must also have a particular design making the use of the connectors limited. The panels in the present invention can be made from any wood, masonite, plastic, or metal; hence, the hinge lock mechanism is very versatile.

SUMMARY OF THE INVENTION

This invention is directed to a hinge lock mechanism for joining two or more panels together (i.e. flat or box frame panels) at any angle comprising a top arm with a slanted flat surface thereon that is integrally connected to a housing with a passageway therein having left hand threads thereon, a bottom arm with a slanted flat surface thereon that is connected to a housing at one end with a passageway therein having a flat surface, a center shaft that passes through the top and bottom housings that has left hand threads for communication with the threads in the top housing and a smooth position with a flat surface for communicating with the bottom housing, locking means that fit on each end of the center shaft, and clamping means for securing the arms in the panels.

This invention is also directed to a fixed angle locking mechanism having at least two arms with a slanted flat surface thereon and clamping means for securing the arms into the panels. These locking mechanisms can have many configurations such as 180° angle and 90° angle, a T shape with three arms, a cross shape with four arms, a Y shape with three arms, etcetera.

This invention is further directed to a portable, multiple panel, display unit used as sub-structures for exhibits, booths, classroom dividers, art gallery partitions, and the like. This display unit comprises several individual detachable panels, each with recessed retainer grooves along its vertical edge. Replaceable hinge lock mechanisms (at a minimum of three per panel connection) fit into adjoining retainer grooves to interconnect adjacent panels. The edge of the panels are bevelled with the point of the bevelled edge of the panels being abutted together to give the appearance of being a continuous, seamless edge that provides a pleasing appearance for the unit. Any number of panel accessories (i.e., light boxes, shelves, etc.) or flat panels (with or without cut-outs) made to the desired dimension can be used. In so doing, the number of sides can be increased or decreased to form any desired shape, thus lengthening or shortening the display unit.

This invention is further directed to a method of assembling the display unit comprising bevelling the ends and drilling holes in the ends of the desired number of panels for receiving hinge lock mechanisms noted above, setting the hinge lock mechanisms to the desired angle or using a fixed hinge lock mechanism of the desired angle, sliding one arm of the mechanism into the hole in the panel end and through a rod clamp until the arm is in the desired position and tightening the rod clamp, inserting the panel to be joined onto the other arm of the mechanism and through a rod clamp and tightening into position when the seams of the panels are tight, wherein at least three mechanisms are used to join two panels.

DESCRIPTION OF DRAWINGS

Other advantages of the invention will become apparent from the detailed description below and upon reference to the drawings in which:

FIG. 3 is a perspective showing a display unit composed of hinge lock connected panels;

FIG. 4 is a sectional view taken along plane 3—3 of FIG. 3 illustrating the hinge lock mechanism at a 180° angle in adjacent panels;

FIG. 5 is a sectional view of a clamping means;

FIG. 6 is a sectional view of another embodiment for using the hinge lock mechanism for joining thin panels;

FIG. 7 is a front view of the clamping means shown in FIG. 6;

FIG. 8 is a side view of a 180° fixed hinge lock mechanism;

FIG. 9 is a side view of a 180° fixed hinge lock mechanism that has one arm with threads thereon;

FIG. 10 is a side view of a T fixed hinge lock mechanism for use with a return divider;

FIG. 11 is a side view of a 90° fixed hinge lock mechanism;

DETAILED DESCRIPTION

Figure 1:
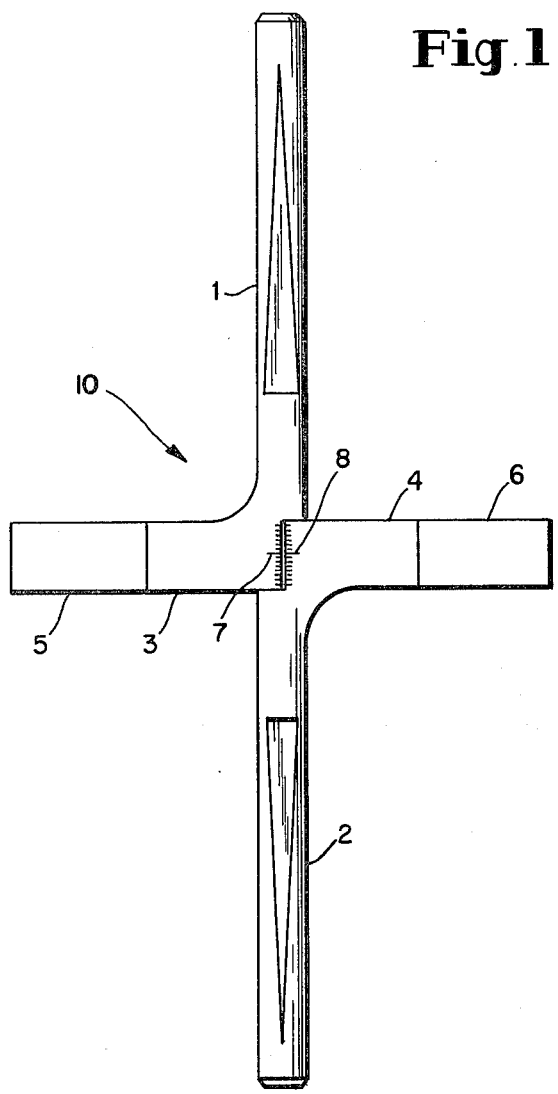
FIG. 1 is a top view of the hinge lock mechanism.

FIG. 1 shows generally hinge lock mechanism 10 with the top arm 1 that is integrally connected to a housing 3 which has degree markings 7 graduated thereon. Bottom arm 2 tapers into housing 4 which has an indicator marking 8 thereon for aligning the desired angle of the arms 1 and 2. Top locking means 5 and bottom locking means 6 urge the housings 3 and 4 together in a locking relationship hereinafter further explained.

Figure 2:
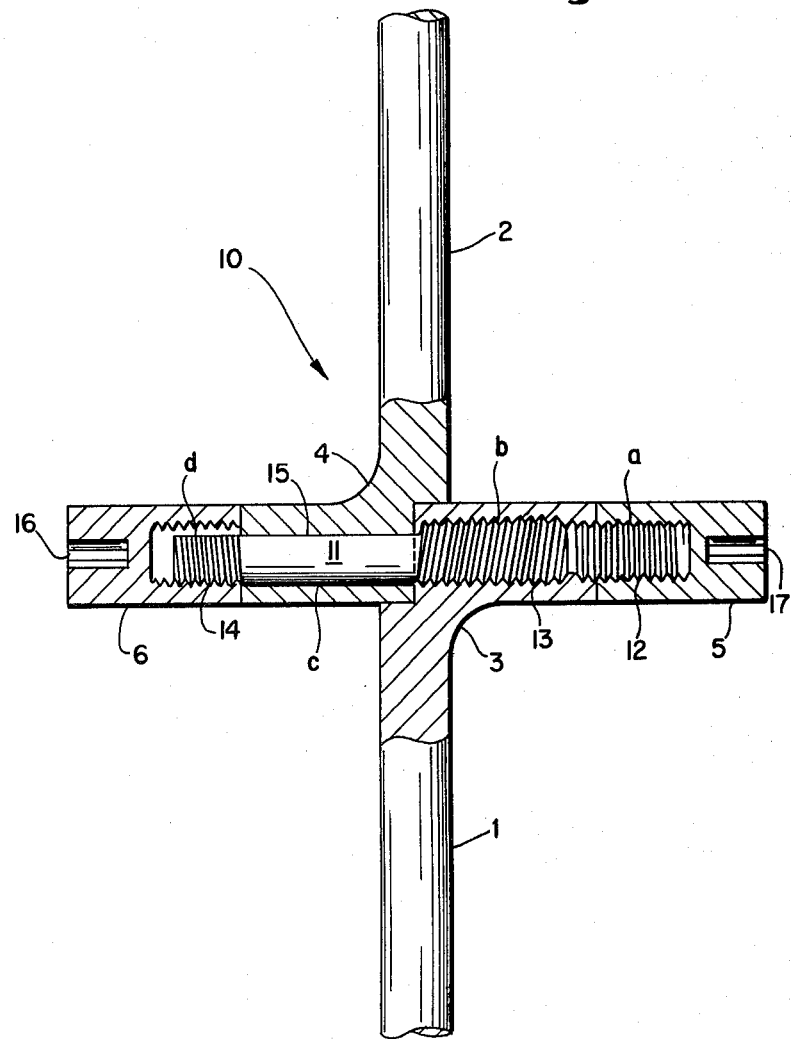
FIG. 2 is a cross section of the hinge lock mechanism.

FIG. 2 shows a cross sectional view of the hinge lock mechanism 10 that shows a center shaft 11 which has sections a, b, c, and d. Section a has right hand threads 12 thereon for receiving top locking means 5. Section b has left hand threads 13 thereon for engaging the threads in top hinge lock housing 3. Section c is a smooth rod that has a flat surface 15 which extends from the bottom of section b to the end of section d. Section c seats the bottom housing 4 that has a flat surface for engaging the flat surface 15 of section c. In this manner the center shaft 11 and bottom arm 2 must move together. Section d has right hand threads 14 to receive bottom locking means 6 that tightens against the bottom housing 4 when locking. The top and bottom locking means 5 and 6 are tightened or loosened via slots 17 and 16 that receive a set screw wrench such as an Allen wrench.

In operation, when the bottom locking means 6 is tightened against the housing 4, the bottom housing 4 is urged against the top housing 3 preventing it from moving in a downward counter clockwise direction, In a similar manner when the top locking means 5 is tightened against the top housing 3, the top housing 3 is locked into place since the left hand thread 13 in the housing 3 would oppose any movement of the locking means 5. In other words, tightening the locking means 5 tightens the housing 3. Because of the restricted movement of the bottom housing 4 and center shaft 11 due to the flat surfaces of the shaft 11 and housing 4 whereby both must move together when the locking means 6 is tightened, the bottom housing 4 is unable to move in a clockwise direction.

The top housing 3 has left hand threads therein so that it locks against the top locking means 5 when moving in an upward clockwise direction; simultaneously the top locking means 5 which is right hand threaded moves downward in a clockwise direction. This action locks the top housing against the top locking means 5 preventing any movement of the arms. The bottom housing 4 has the flat surface that corresponds to flat surface 15 in sections c and d of the center shaft and allows the housing 4 to stay locked to the shaft without any left or right movement. Since the bottom housing 4 has no threads therein, tightening the bottom locking means 6 urges the bottom housing 4 against the top housing 3 preventing any movement between the arms.

The hinge lock mechanism 10 is locked into position in the panels by clamping means 20 having a horizontal hole 21 (FIGS. 4 and 5) through its side for receiving arms 1 and 2 and a downwardly slanted hole 22 through its top communicating with hole 21 with threads therein. A set screw 23 is screwed in hole 22 for tightening against the arms 1 and 2. The clamping means 20 also has upward flaring ridges 25 around its perimeter for wedging itself into the panels permanently.

The arms 1 and 2 have flat slanted surfaces 18 and 19 thereon which are slanted in the opposite direction of the slanted hole 22 of the clamping means 20. Hence, when the arms are locked into the panels with the clamping means, the opposing slanting directions of the arms and holes 22 lock the arms in the desired position without any movement away from the panel.

The hinge lock mechanism can be used to hinge any material such as wood, masonite, plastic or metal together to form any angle, preferably from 60° to 300° angles. Regardless of what angle is desired, the hinge lock mechanisms can be adjusted with the panel joints remaining tight. This is accomplished by bevelling the ends of the panels that are to form the joints. Hence, when viewing the panels at the joints from the desired side of the panels the only thing that is seen is a seam regardless of what angle the panels are in. Another approach to the understanding of the hinge lock system is to visualize a piece of natural grain wood cut in half and bevelled back 45° from the face of the panel on both ends. Now think of the center cut edges being hinge locked together to form different angles. As the joint is moved through different angles and the panels are adjusted onto the hinge locks at the different angles, the seam and grain of the wood remain tight together and unchanged.

Figure 15:
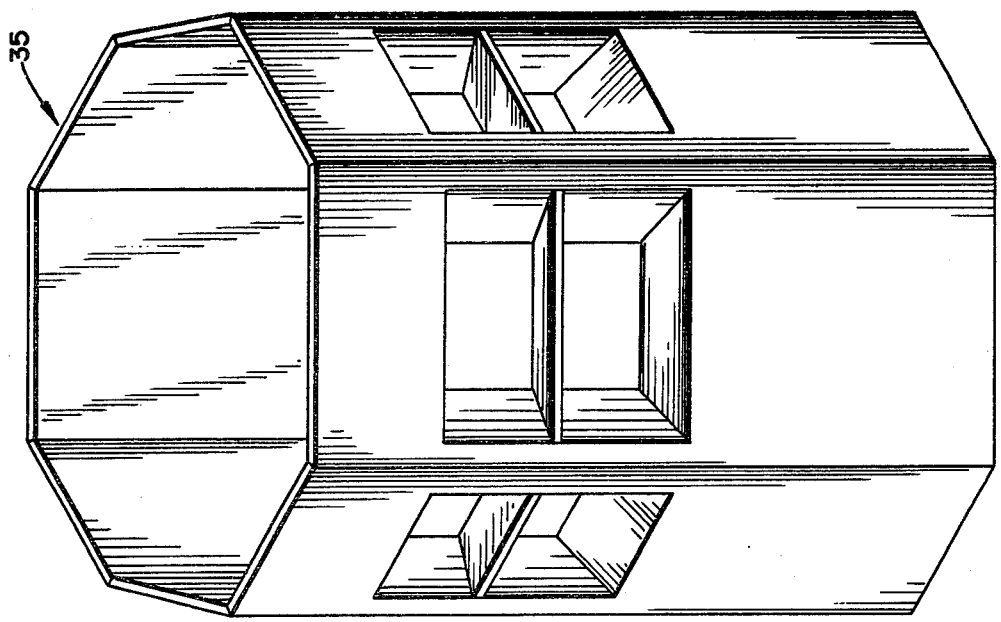
FIG. 15 is an octagon shaped display unit with windows therein for displaying various presentations.
Figure 14:
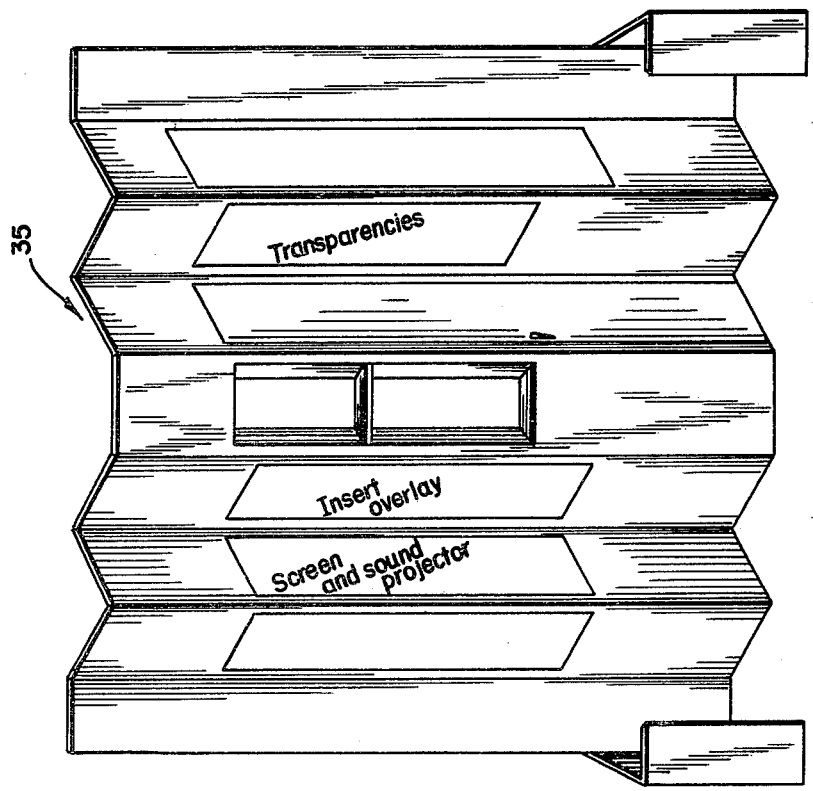
FIG. 14 is a showing of a straight wall display unit with windows therein for displaying various presentations.

FIG. 3 shows a simple assembled display unit 35 that is composed of a series of interconnected display panels 36, 37, 38, and 39 arranged to provide a self supporting backwall structure. Ordinarily, each of these panels 36 to 39 is identical, although one or more of the panels can have an auxiliary attachment such as a door, a box, or a low partition fence for a particular setting. The panels can be arranged into any setting from a straight wall such as shown in FIG. 14 to a circular shape or octagon shape as shown in FIG. 15. In other words, this unit 35 can be comprised of as many panels as needed for a particular display and can be arranged into any configuration. This unit 35 is normally the sub-structure of a display that can be used as the backwall for any new and different type exhibit or display to accomodate any size display area. For example, FIG. 14 shows a display unit 35 with the panels having cut out windows with shelves for displaying objects therein with backlighting, for displaying messages in transparencies, for displaying a motion film with sound projector and screen, or with an insert overlay in the window for accentuating a mounted product or message on the face of the panels. A door can be used to store materials behind or within the unit. All of the windows in the display unit can be used to show only one type of set up or many different kinds; backlighting can be used to accentuate any of the set up windows. If desired, the unit can be all solid panels without windows as shown in FIG. 3. FIG. 15 shows the octagon configuration of the unit with all of the windows in the showcase set up with backlighting. It should be understood that any number of display panels can be used depending on the needs of the display; nevertheless, it has been found that a unit with eight 96 inches by 32 inches by 1 inch panels is the preferred size of the unit for transporting and versatility. The panels can be made of any type material such as plywood, pressed particle board, masonite, plastic, or metal. The panels can have cut out windows for accentuating the display behind them with lighting or the like.

As implied in FIG. 3, the unit 35 may be readily detached for storage or the setting changed with only a simple tool as a set screw wrench. Additional panels (not shown in FIG. 3) may be added to the unit. The individual panels 36 to 39 can be any convenient size, but it has been found desireable to use the standard size panels of eight feet (96 inches) tall by four feet (48 inches) wide. The thickness of the panels can have a wide range of sizes depending on what type of materials the panels are made, but normally ¼ inch to 3 inch panels are used for most display units. Using light weight plastics or masonite panels of any thickness can be used and easily handled. In any display structure the unit has a high aesthetic value, since it looks like a continuous, uninterrupted smooth flowing structure. This display unit can be used repeatedly.

FIG. 4 shows the hinge lock mechanism situated in panels 37 and 38 at about a 180° angle secured with clamping means 20 with slanted hole 22 therein, and set screw 23 for screwingly engaging arms 1 and 2. The passage 30 with recess 60 (shown by dashed lines in FIG. 4) and hole 31 are cut into the panel for accepting the hinge lock mechanism. The arms 1 and 2 slide through the hole 21 in the clamping means 20 that is wedged into the hole 31. The set screw 23 is tightened in the threaded hole 22 whereby the arms 1 and 2 are pressed against the interior walls of the passage 21 in the panels to secure hinge lock mechanism into position.

This embodiment is used only when the panels are a sufficient thickness for accepting the mechanism. A minimum of three hinge lock mechanisms is used to connect eight feet tall panels.

FIGS. 5, 6, and 7 show another embodiment of the clamping means used when the panels are too thin to insert the mechanism 10 therein and to secure the clamping means to the back of flat panels without having to drill holes for inserting the hinge lock mechanism into the panels. This embodiment can also be used with boxbeaming. In this embodiment, members 26 with a horizontal recessed slot 28 for accepting the arms 1 and 2 and a slanted hole 29 with threads therein somewhat perpendicular to said slot 28 are situated on the backside of the panels. Large cut out openings 27 are in this clamping means 26 for easy acess to the floor thereof where openings 33 are located for securing this means 26 to the panel with screws 34. Note that screws 34 should not go completely through the panel. As an alternative means of screwing the clamping means 26 to the panel, a center hole 32 with threads therein is in the bottom of clamping means 26; a flat head bolt 40 can be screwed through the panel into the hole 32 for securing the clamping means 26 to the panel. The bolt 40 fits flush with the panel from the opposite side. The members 26 accept an arm 1 or 2 after it has been secured to the back side of a panel; the set screw 41 is tightened against the arm for screwing it into the position.

Figure 12:
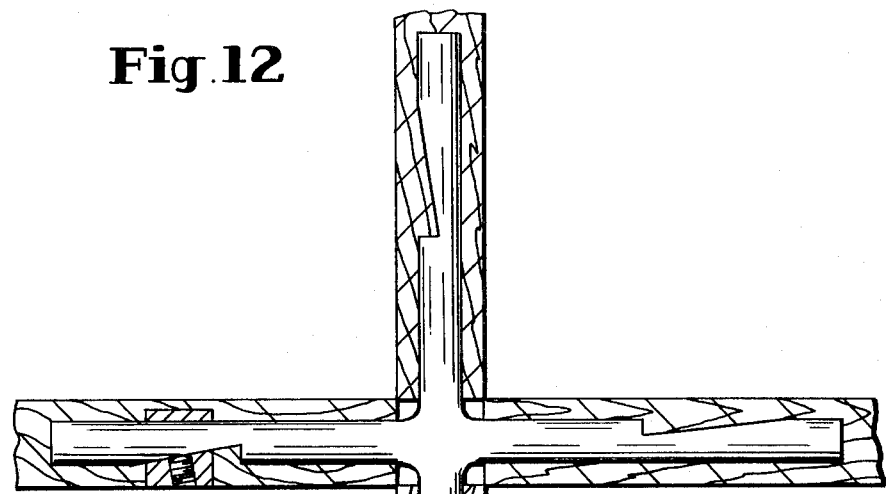
FIG. 12 is a view of a cross fixed hinge lock mechanism.
Figure 13:
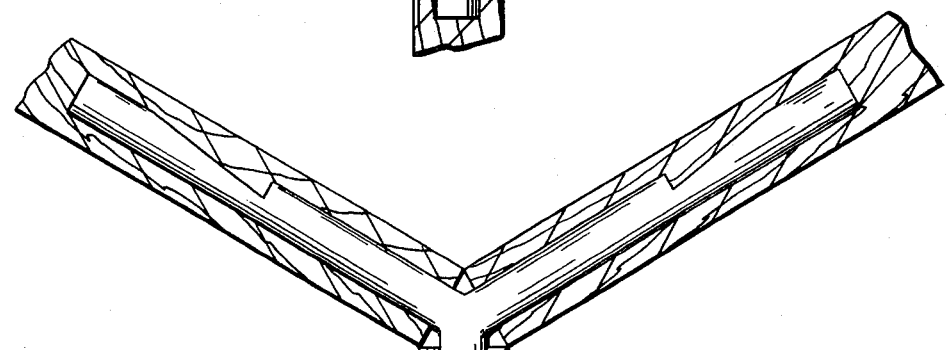
FIG. 13 is a side view of a Y fixed hinged lock mechanism.

Other embodiments of the hinge lock mechanism are illustrated in FIGS. 8 to 13 wherein a need arises for a permanent angle. FIG. 8 shows two arms 1 and 2 with slanted, flat surfaces 18 and 19 and the center mark 50 scored thereon. This fixed hinge lock mechanism is for a permanent 180°, the mark 50 is for aligning the center in the panels. FIG. 9 shows a modification of FIG. 8 with a screw at one end. The screw end is first screwed into the panel and then the other arm is affixed as described previously. FIG. 10 shows a fixed hinge lock T mechanism that can be used for a return divider. FIG. 11 shows a fixed right angle that can be used in any situation where the commonly used right angle is needed such as in furniture, paneling, etc.. FIG. 12 shows a fixed hinge lock cross mechanism where four panels must come together at 90° angles at a common intersection. FIG. 13 is a Y arrangement used where three panels must come together at 60° angles at a common intersection. It should be understood that in each of these fixed angle embodiments the arms would have the slanted, flat surfaces thereon to be used with the clamping means so described above. These fixed hinge lock mechanisms are economical to make and use in any desired angle situation.

The desired angle is set on the hinge lock mechanism (see FIG. 1) by first loosening the locking means 5 and 6 on each end of center shaft 11, locating the desired angle by moving arm 1 until degree indicator 7 thereon is opposite the desired degree calibrated on housing 4, and then tightening the locking means 5 and 6 firmly with a set screw wrench that fits in slots 16 and 17. These arms will then be locked as mentioned above. When the arms move in one direction, the locking means moving in the same direction actually tightens itself, thus preventing the movement of the arms.

It will be seen that the present invention provides a new and useful hinge lock mechanism for combining panels having desireable advantages and characteristics, including those pointed out herein, and others which are inherent in the invention. It is contemplated that those skilled in the art may make certain modifications and changes in the hinge lock mechanism described herein without departing from the spirit of the invention or the scope of the appended claims.

What is claimed:

1. A hinge lock mechanism for joining two or more panels together at any angle comprising a top arm with a slanted, flat surface thereon that is integrally connected to a housing with a passageway therein, having left hand threads thereon, a bottom arm with a slanted, flat surface thereon that is integrally connected to a housing at one end with a passageway therein having a flat surface, a center shaft that passes through the passageways of the top and bottom housing, said center shaft having left hand threads on one portion thereof for communicating with the threads in the top housing and a smooth portion with a flat surface for communicating with the bottom housing and at each end having a right hand threaded portion, locking means with right hand threads therein that fit on each end of the center shaft for urging the top and bottom housing together in a locking relationship, and clamping means for securing the arms with the panels.

2. The hinge lock mechanism of claim 1 wherein the clamping means has a cylinder shape with upward flaring ridges on the outside thereof, a horizontal hole therein for receiving the arms of the hinge lock mechanism and a downwardly slanted hole with threads therein that is substantially vertically oriented and communicates with the horizontal hole and a set screw means in said downwardly slanted hole for tightening against said arms for locking said arms into the panels.

3. The hinge lock mechanism of claim 1 wherein the clamping means is comprised of a member with a horizontal recessed slot therethrough for receiving said arms, means for securing said member to the back side of the panel and a downwardly slanted hole with threads therein that communicates with said horizontal recessed slot and a set screw means in said downwardly slanted hole for tightening against said arms for locking said arms into panels.

4. A hinge lock mechanism for joining two or more panels together comprising at least two arms having a slanted, flat surface thereon, and clamping means for securing the arms with panels having a cylinder shape with upward flaring ridges on the outside thereof, a horizontal hole therein for receiving the arms of the hinge lock mechanism and a downwardly slanted hole with threads therein that is substantially vertically oriented and communicates with the horizontal hole and a set screw means in said downwardly slanted hole for tightening against said arms for locking said arms into said panels, said arms being fixedly oriented at selected angles.

5. The hinge lock mechanism of claim 4 wherein the fixedly oriented selected angle is from 45 degrees to 180 degrees of two arms.

6. The hinge lock mechanism of claim 4 wherein the fixedly oriented selected angle is a T shape of three arms.

7. The hinge lock mechanism of claim 4 wherein the fixedly oriented selected angle is a cross shape of four arms.

8. The hinge lock mechanism of claim 4 wherein the fixedly oriented selected angle is a Y shape of three arms.

9. The method of claim 8 wherein the hinge lock mechanism used to assemble the displaying unit is set to the desired angle.

10. A multiple panel displaying unit comprising a plurality of panels hingedly joined together with a plurality of detachable hinge lock mechanisms of claim 1.

11. The multiple panel displaying unit of claim 5 wherein the unit has eight 96"×32"×1" masonite panels which include one door panel.

12. The multiple panel displaying unit of claim 6 wherein the panel has cut out windows.

13. The multiple panel displaying unit of claim 10 wherein the panels are selected from the class consisting of wood, pressed particle board, masonite, plastic, and metal.

14. The method of assembling the displaying unit of claim 10 comprising bevelling the ends and drilling arm-receiving holes and housing-receiving recesses in the ends of the desired number of panels for receiving hinge lock mechanisms, using the desired angle hinge lock mechanism, sliding one arm of the hinge lock mechanism into the hole in the panel end and through a rod clamp until the arm is in the desired position and tightening the rod clamp, inserting the other arm of the hinge lock mechanism into the hole of the other panel to form the joint through a rod clamp and tightening the rod clamp so that the seam at the joint of the panels is tight and locking and continuous, wherein at least three hinge lock mechanisms are used to join panels of 96"×32".

* * * * *